United States Patent Office 3,371,066
Patented Feb. 27, 1968

3,371,066
PROCESS FOR ISOLATING GRANULAR POLY-OXYMETHYLENE FROM A SOLUTION
Werner Grundmann, Hofheim, Taunus, Hans Dieter Hermann, Frankfurt am Main, Karl-Heinz Kasten, Kelkheim, Taunus, and Otto Kammann, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 21, 1964, Ser. No. 361,594
Claims priority, application Germany, Apr. 24, 1963,
F 39,572
3 Claims. (Cl. 260—67)

ABSTRACT OF THE DISCLOSURE

Process for precipitating a stabilized polyoxymethylene copolymer in granular form by introducing a solution of the copolymer into a turbulent liquid coolant having a temperature 1° to 10° C. below the sintering limit of the copolymer.

The object of the present invention is a process for isolating granular polyoxymethylene, the polymer molecule of which contains oxyalkylene units with at least two adjacent carbon atoms in the main chain besides oxymethylene units, from a solution of the stabilized polymer in a mixture of water and solvent.

With regard to further processing, polyoxymethylenes should have a high thermal stability, i.e. they must possess stable terminal groups which are resistant to degradation. With copolymers of trioxane or formaldehyde containing in the main chain oxyalkylene units with at least two adjacent carbon atoms besides oxymethylene units these stable terminal groups can be produced by subjecting the said copolymers to a thermal and/or alkaline stabilization process wherein the oxymethylene units are split off at the end of the polymer chains. The degradation comes to a standstill as soon as the oxyalkylene units are reached. A preferred mode of stabilization of the terminal groups is, owing to its rapid course, the treatment of the polymer in an alkaline solution at temperatures in the range of from 100 to 200° C.

When these polymers are isolated by conventional methods, for example by strongly undercooling the solution or by precipitation in a precipitating agent, a felted fibrous product is obtained. The fibers are readily caught in conduit branchings, armatures and apparatus parts and cause cloggings. To separate the liquid relatively large filter areas are required since the fibers have a moisture content and are difficult to filter. The isolated product has a low bulk weight and because of its fibrous nature makes its further use considerably difficult. Polymers isolated by other known precipitating methods also have undesirable low bulk weight making their after treatment, particularly liquid separation, dosing, and extrusion, very difficult.

When known methods are used it is not possible to isolate, from a mixture of water and solvent, stabilized polyoxymethylenes having a granular nature, a high density and satisfactory utilitarian properties for the aftertreatment and further use.

The present invention relates to a process for isolating granular polyoxymethylene, the polymer molecule of which contains oxyalkylene units with at least two adjacent carbon atoms in the main chain besides oxymethylene units, which comprises introducing a solution of the stabilized polymer in a water/solvent mixture into a liquid cooling agent kept in turbulent motion and maintained at a temperature 1 to 10° C. below the sintering limit of the polymer. In the relevant literature the sintering limit of a polymer is the temperature below the melting point at which the particles become pasty or liquid on their surface and agglomerate without fusing together completely. Melting point and sintering limit depend on the molecular weight and the composition of a polymer. In general, temperatures in the range of from 100° C. to 150° C. are applied.

As cooling agent there can be used water or organic compounds, such as alcohols, glycols, ethers, esters or ketones. The organic compounds may be used either individually or in admixture with one another. When the indicated temperature limits are observed, a fine-grained, dense polymer is obtained which is easy to treat and can be readily separated from the liquid. The product has a considerably higher bulk weight than a fibrous product. If the temperature of the cooling agent drops by more than 10° C. below the sintering temperature, the polymer first precipitates in the form of short fibers. At a still lower temperature it precipitates in the form of long fibers. On reaching or exceeding the sintering temperature the polymer agglomerates to form lumps. By modifying the turbulence of the cooling agent the critical temperature can be slightly shifted to the one or the other side.

By changing the cooling agent or its compositon the temperature of the sintering limit can be shifted. Therefore, it is possible to work at a higher or lower temperature level. The purity of the product can be improved by additives dissolving undesired impurities originating, for example, from the preceding stabilization.

The process can be carried out either continuously or batch-wise with the use of tube systems, closed stirring vessels or other apparatus suitable for bringing the solution into direct contact with the cooling agent. The devices must be provided with means to adjust the temperature, for example heating jackets and cooling jackets, partial current condensers or reflux condensers and must resist operating pressures which depend on the chosen temperature level and the composition of the cooling agent. The required temperature can be maintained indirectly via the jacket or directly by supplying and discharging partial currents and by partially evaporating the cooling medium or one of the constituents thereof. When the process is carried out batch-wise, the change in sintering temperature with change in the concentration of the cooling agent must be taken into consideration.

A test series using water as coolant in a stirred vessel illustrates the relationship between the temperature of the cooling agent and the shape and nature of the product. In each test the same polymer solution was introduced in an amount corresponding to one kilogram of polymer. The temperature was adjusted by external cooling and partial release.

| Test No. | Temperature of cooling agent, °C. | Pressure in stirring vessel, absolute atm. | Time of charge, hrs. | Moisture of product, percent | Bulk Weight of dry polymer, g./l. | Nature of product |
|---|---|---|---|---|---|---|
| 1 | 20 | 1 | 0.5 | 95 | 50 | Long fibers. |
| 2 | 100–110 | 1–3 | 1 | 90 | 40 | Short fibers. |
| 3 | 115–120 | 7–9 | 1 | 90 | 40 | Do. |
| 4 | 125–130 | 7–9 | 1 | 75 | 140 | Fibrous/granular. |
| 5 | 125–130 | 7–9 | 1.5 | 70 | 130 | Do. |
| 6 | 132–134 | 6–8 | 2 | 70–75 | 200 | Granular. |
| 7 | 136–140 | 8–10 | 1 | | | Lumpy, sintered. |

The composition of the polymer solution and the apparatus used are described in the following example. The choice of the solvent or solvent mixture used in addition to water depends on the type of polymer to be treated and can be varied within wide limits.

The following examples serve to illustrate the invention but they are not intended to limit it thereto.

*Example 1*

For isolating a granular copolymer of trioxane and 2% of ethylene oxide from a 10% homogeneous solution of the said polymer in a mixture of 49.9% of methanol, 50% of water and 0.1% of ammonia, as obtained in a stabilization process with a temperature of 150° C. and under a pressure of 13 atmospheres gauge, the solution was introduced into a stirring autoclave by means of a heated immersion tube.

The stirring autoclave had a capacity of 50 liters and contained at the beginning of the introduction of the solution 20 liters of water heated at 132° C. The stirrer rotated at a speed of 1400 revolutions per minute so that a high degree of turbulence was imparted to the contents of the autoclave. With continuous stirring, an amount of solution was introduced containing 1 kilogram of polymer. The temperature of the liquid was maintained constant at 132–134° C. by indirect cooling with a jacket. The temperature was 6–8° C. below the sintering temperature of the polymer in a mixture of methanol and water containing 10% by weight of methanol, and 5–7° C. below the sintering temperature of the polymer in a mixture containing 15% by weight of methanol.

During the introduction of the hot polymer solution the pressure in the vessel rose. By addition of nitrogen and release of pressure during the test, the pressure was maintained between 6 and 8 atmospheres gauge. After 2 hours the pressure in the vessel was released to normal. The vessel contained a fine-grained polymer in a mixture of methanol and water. The solid polymer was separated by filtration and dried. 1 kilogram of polymer was obtained having a bulk weight of 200 g. per liter.

*Example 2*

A suspension consisting of 10 parts by weight of a copolymer of trioxane with 2% of ethylene oxide and 100 parts by weight of a solution containing 60% by weight of methanol, 39.9% by weight of $H_2O$ and 0.1% by weight of triethylamine was continuously pumped under pressure into a tube maintained at 160° C.; the dimensions of the tube and the velocity of the supply of the suspension were chosen so that the suspension remained in the tube for 3–5 minutes. On passing through the tube the polymer dissolved. The solution was then conducted into a second tube in which it was cooled to 135° C. The cooled solution was introduced from above into an autoclave in which a mixture of 60% by weight of methanol and 40% by weight of water were kept in turbulent motion. The temperature of the mixture was maintained at 125° C., i.e. 3° C. below the sintering temperature of the polymer in the mixture. The separated polymer and the solvent mixture were continuously discharged with cooling at the lower end of the autoclave. The autoclave had a volume such that the average residence time of the polymer was 10–20 minutes. The precipitating polymer was granular and easy to filter. After suction filtration the polymer had a content of dry substance of 30–40%; in the dry state the polymer had a bulk weight of 250–300 g./l.

We claim:

1. A process for isolating a stabilized granular polyoxymethylene copolymer comprising oxyalkylene units having at least two adjacent carbon atoms, as well as oxymethylene units, in its main chain, which process comprises introducing a solution of the stabilized copolymer in a mixture of water and organic solvent into a turbulent liquid cooling agent having a temperature 1° to 10° C. below the sintering limit of the copolymer.

2. The process as claimed in claim 1, wherein the cooling agent is at least one organic compound selected from the group consisting of alcohols, glycols, ethers, esters and ketones.

3. The process as claimed in claim 2, wherein the organic compound is in admixture with water.

References Cited

UNITED STATES PATENTS

| | | | |
|---|---|---|---|
| 2,989,509 | 6/1961 | Hudgin et al. | 260—67 |
| 3,174,948 | 3/1965 | Wall et al. | 260—67 |
| 3,225,005 | 12/1965 | Asmus et al. | 260—67 |

WILLIAM H. SHORT, *Primary Examiner.*

SAMUEL H. BLECH, *Examiner.*

L. M. PHYNES, *Assistant Examiner.*